(12) United States Patent
Lee

(10) Patent No.: US 7,207,672 B2
(45) Date of Patent: Apr. 24, 2007

(54) FASTENING STRUCTURE BETWEEN A LENS AND A FRAME OF A PAIR OF SPECTACLES

(76) Inventor: Chieh-Lun Wang Lee, No. 473, Chung Shan Nan Rd., Yung Kang City, Tainan Hsien (TW)

( * ) Notice: Subject to any disclaimer, the term of this patent is extended or adjusted under 35 U.S.C. 154(b) by 0 days.

(21) Appl. No.: 11/175,614

(22) Filed: Jul. 6, 2005

(65) Prior Publication Data

US 2007/0008483 A1    Jan. 11, 2007

(51) Int. Cl.
*G02C 1/04* (2006.01)
(52) U.S. Cl. .................. 351/103; 351/106; 351/146; 351/154
(58) Field of Classification Search .................. 351/41, 351/103–109, 140, 141, 143, 146, 149, 150, 351/154
See application file for complete search history.

(56) References Cited

U.S. PATENT DOCUMENTS 2,240,725 A * 5/1941 Styll ........................ 351/108
5,367,344 A * 11/1994 Fuchs ........................ 351/41

* cited by examiner

*Primary Examiner*—Huy Mai
(74) *Attorney, Agent, or Firm*—William E. Pelton, Esq.; Cooper & Dunham LLP

(57) ABSTRACT

A fastening structure for a lens and a frame of a spectacles includes a resin lens and a metal frame. A plurality of slots is defined in the lens. A plurality of pins each with a shank and a head is mounted on the frame and respectively positioned in the slots. A plurality of resin sleeves is respectively provided outside the pins. Whereby, the slots will not be directly worn away by the metal pins so as to securely fasten the lens on the frame.

3 Claims, 3 Drawing Sheets

FASTENING STRUCTURE BETWEEN A LENS AND A FRAME OF A PAIR OF SPECTACLES

BACKGROUND OF THE INVENTION

1. Field of the Invention

The present invention relates to a pair of spectacles, and more particularly to a fastening structure for a lens and a frame of the spectacles.

2. Description of Related Art

With reference to FIGS. 5 and 6, a conventional fastening structure for a lens (40) and a frame (50) is illustrated. The lens (40) is made of a resin, and the frame (50) is made of a metal or alloy. The frame (50) has a plurality of pins (60) each with a shank (61) and a head (62), wherein the head (62) has an outer diameter larger than that of the shank (61). The lens (40) has a plurality of slots (41) defined therein. The shanks (61) are respectively positioned in the slots (41) to fasten the lens (40) on the frame (50).

Because the pins (60) are harder than the lens (40), the size of slots (41) may gradually become oversize due to wear between the shanks (61) and peripheries defining the slots (41). Therefore, the pins (60) cannot be securely positioned in the slots (41) for fastening the lens (40) to the frame (50), and the lens (40) will become loose in or even escape the frame (50).

Therefore, the invention provides a fastening structure to mitigate or obviate the aforementioned problems.

SUMMARY OF THE INVENTION

The main objective of the present invention is to provide a fastening structure which can securely position a lens to a frame of a pair of spectacles.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
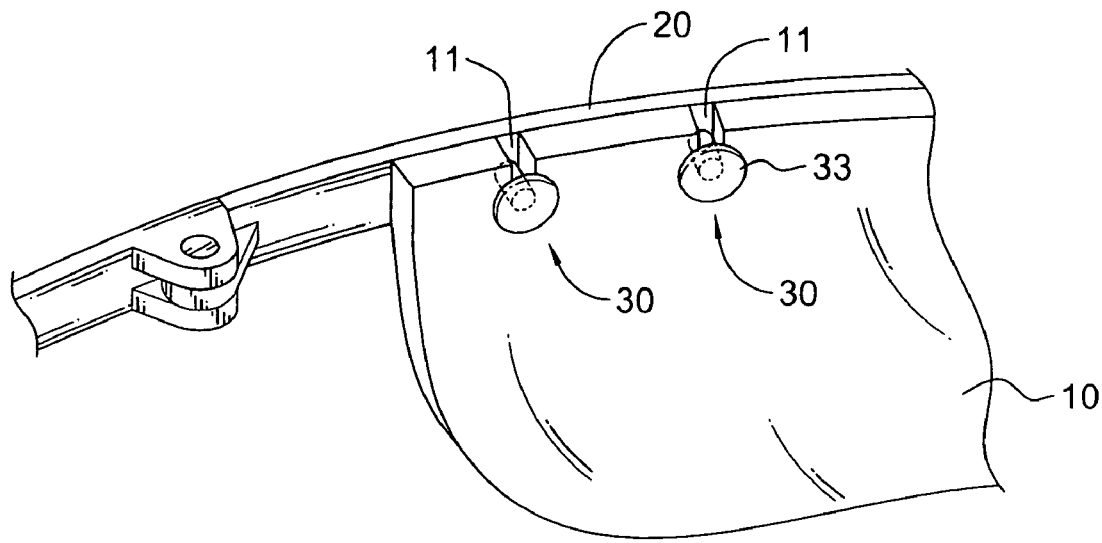
FIG. 1 is a partial perspective view of a lens assembled at an interior side of a frame by a fastening structure in accordance with the present invention.
Figure 2:
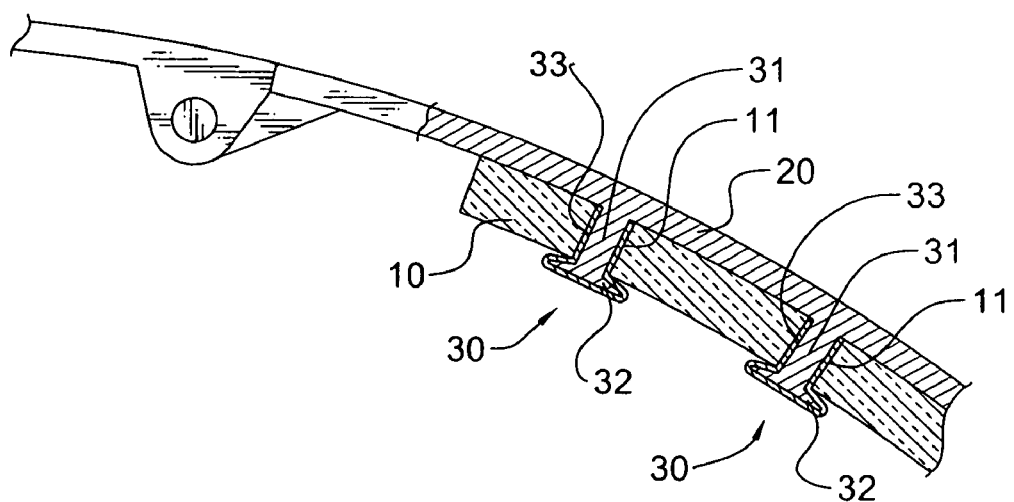
FIG. 2 is a top cross sectional view of FIG. 1.

With reference to FIGS. 1–2, according to the present invention, a frame (20) of a pair of spectacles has a plurality of pins (30) each with a shank (31) and an enlarged head (32). The shank (31) is formed on and protrudes from the frame (20) and has a distal end protruding out of the slot (11). The enlarged head (32) is formed on the distal end of the shank (31), wherein the head (32) has an outer diameter larger than that of the shank (31). The frame (20) including the pins (30) is made of a metal or alloy. A lens (10) made of a resin is assembled on the frame (20) and has a plurality of slots (11) defined therein. It is to be appreciated that the spectacles have two lenses but only one is referred to for simplicity. The shanks (31) of the pins (30) are respectively positioned in the slots (11). The pins (30) each have a sleeve (33) formed thereon. The shanks (31) and heads (32) are completely covered with the sleeves (33), as shown in FIG. 2. The sleeve (33) is also made of a resin, and the slots (11) will not become worn away during installing the lens (10) or long-term use of the spectacles, thus avoiding enlargement of the slots (11). Furthermore, the resin sleeve (33) is flexible so as to position the pins (30) in the slots (11) more securely when taking into account minor discrepancies in the manufacture of the above components.

Figure 3:
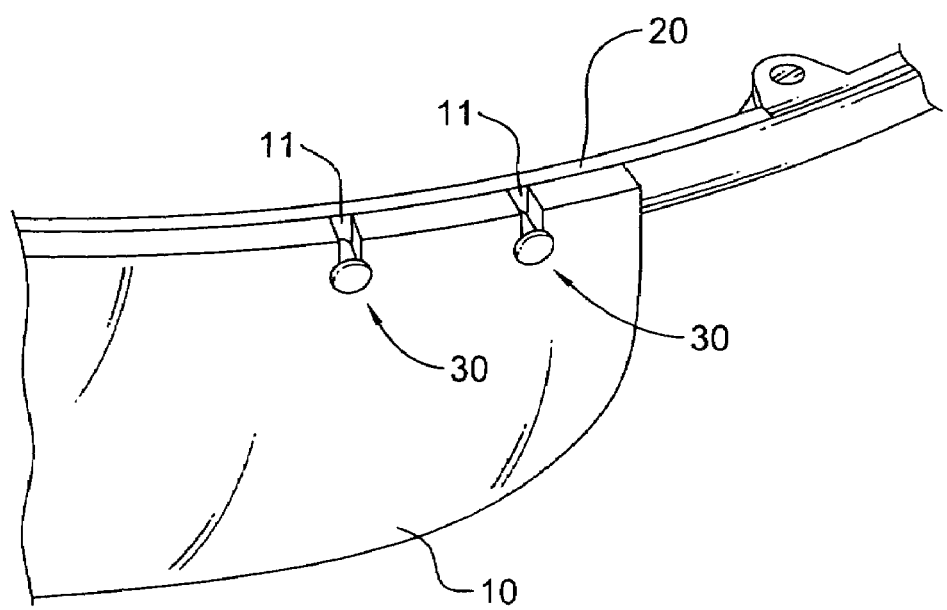
FIG. 3 is a partial perspective view of a lens assembled at an exterior side of a frame and secured by a fastening structure in accordance with the present invention.
Figure 4:
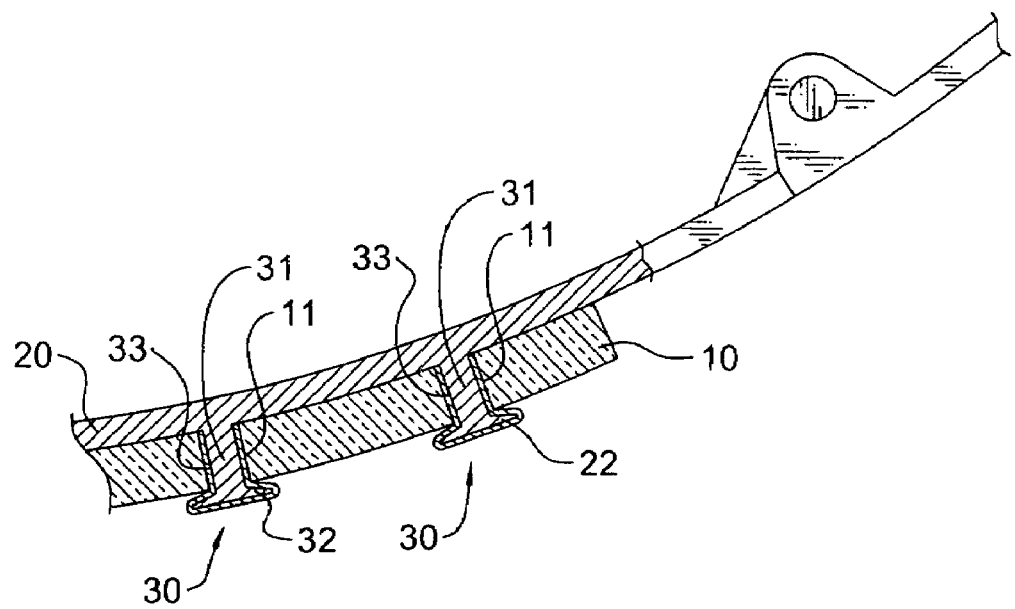
FIG. 4 is a top cross sectional view of FIG. 3.
Figure 5:
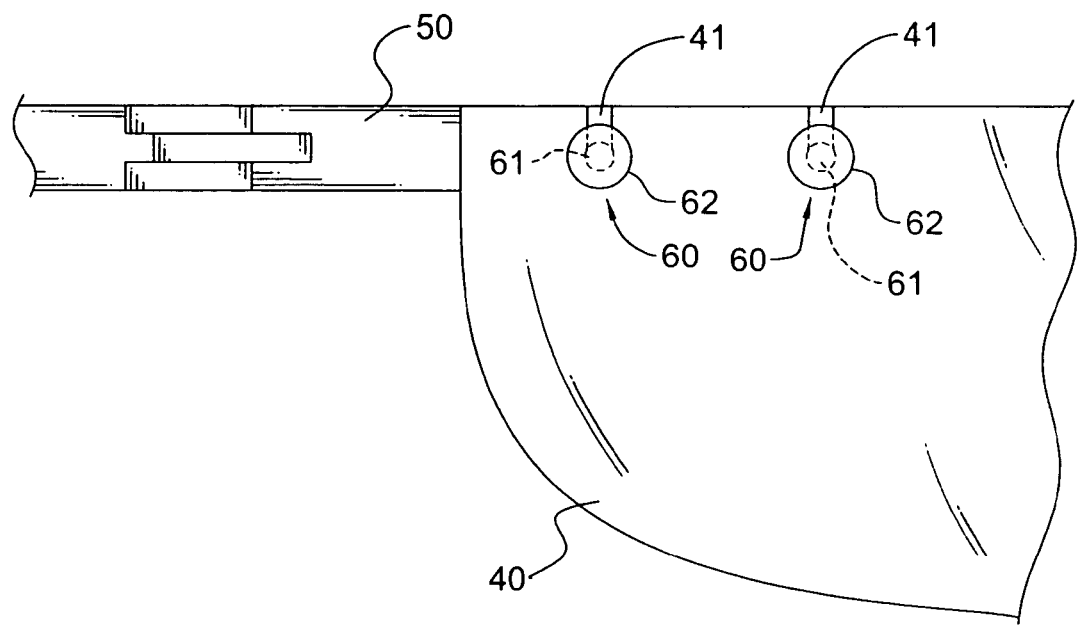
FIG. 5 is a partial front view of a lens secured to a frame by a conventional fastening structure.
Figure 6:
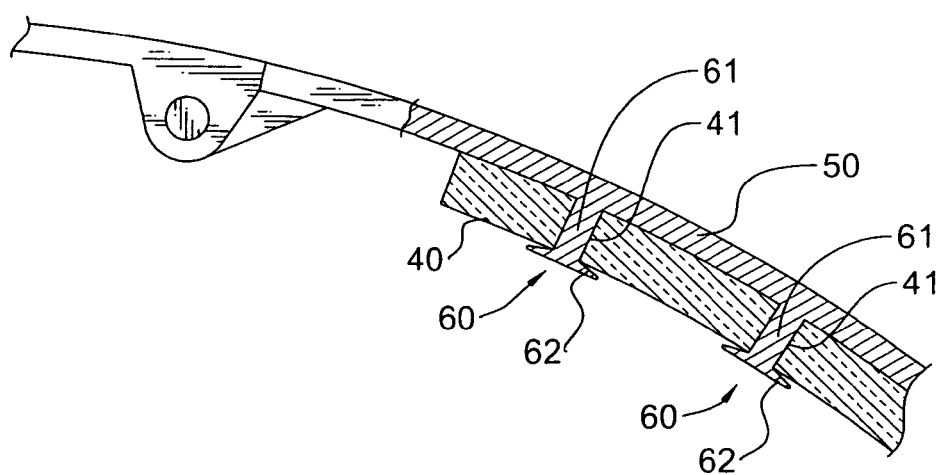
FIG. 6 is a top cross sectional view of FIG. 5.

In this embodiment as illustrated in FIGS. 1 and 2, the pins (30) are formed at an interior side of the frame (20), and the lens (10) is assembled at the interior side of the frame (20). In another embodiment as illustrated in FIGS. 3 and 4, the pins (30) are formed at an exterior side of the frame (20) and each have a shank (31) and a head (32). Each of the pins (30) is covered with a sleeve (33) made of the resin. The sleeve (33) can be completely provided outside the shank (31) and head (32), or only provided outside the shank (31). Therefore, the slots (11) will not become worn away during installing the lens (10), thus avoiding enlargement of the slots (11). Moreover, the resin sleeve (33) is flexible so as to position the pins (30) in the slots (11) more securely in that good alignment is still possible if there are inaccuracies among the slots, frame and pins.

According to the present invention, the resin sleeves (33) are respectively sandwiched between the slots (11) and the pins (30), so the slots (11) will not become directly worn away by the metal pins (30) so as to securely fasten the lens (10) on the frame.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fastening structure between a lens and a frame of a pair of spectacles, comprising:
    a plurality of slots defined in the lens; and
    a plurality of pins corresponding to the slots and each having
        a shank formed on and protruding from the frame, positioned in a corresponding slot and having a distal end protruding out of the corresponding slot; and
        an enlarged head formed on the distal end of the shank; wherein each enlarged head has an outer diameter larger than that of the shank, and a plurality of resin sleeves respectively provided outside the pins and each resin sleeve completely cover the shank and the head of a corresponding pin to avoid enlargement of the slots and to prevent the lens from being worn away during installing the lens on the frame.

2. The fastening structure as claimed in claim 1, wherein the pins are formed at an exterior side of the frame.

3. The fastening structure as claimed in claim 1, wherein the pins are formed at an interior side of the frame.

* * * * *